July 21, 1925.
J. A. FOX
1,546,643
SIGNALING DEVICE FOR MOTOR VEHICLES
Filed Dec. 22, 1922
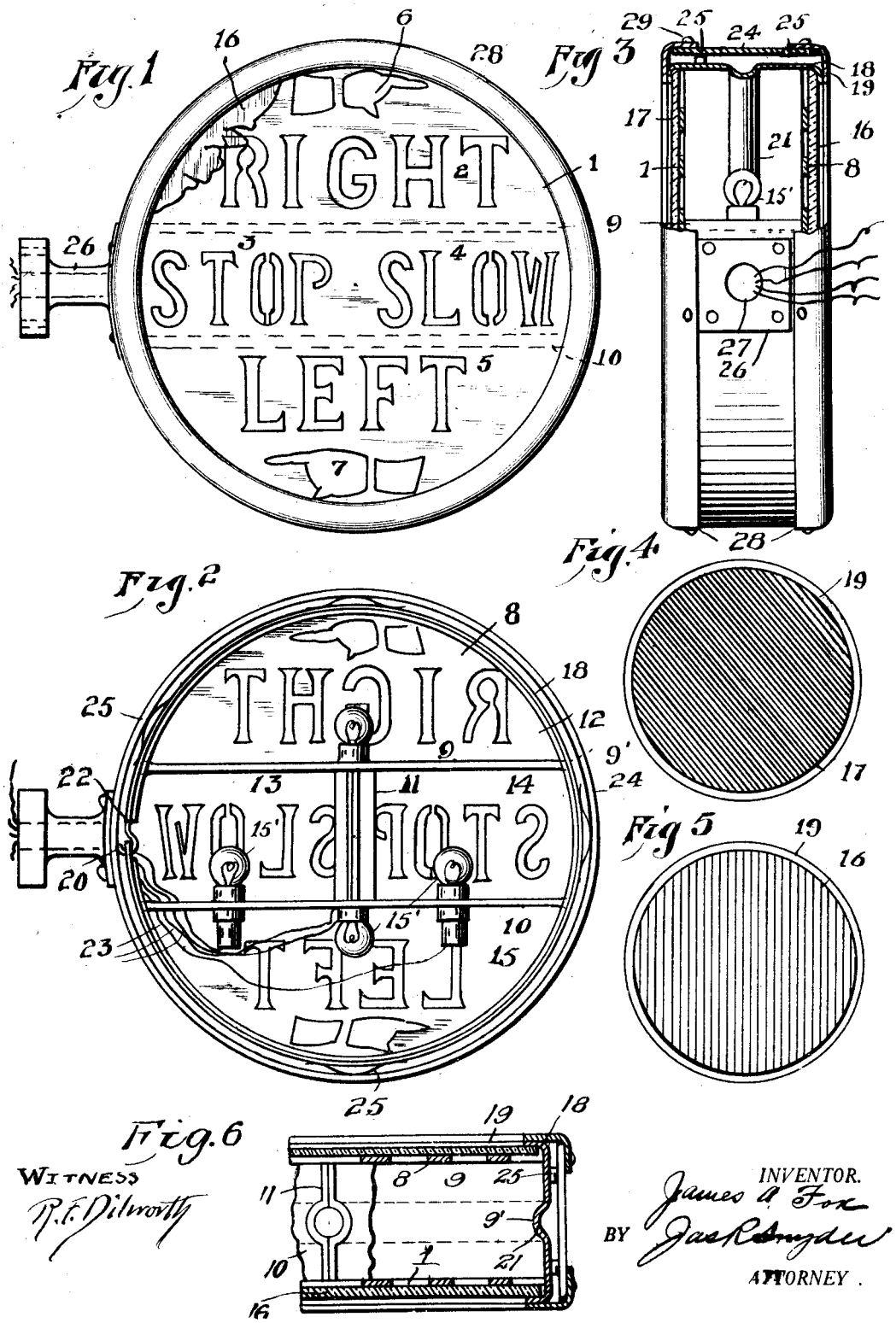

Patented July 21, 1925.

1,546,643

UNITED STATES PATENT OFFICE.

JAMES A. FOX, OF WARREN, OHIO.

SIGNALING DEVICE FOR MOTOR VEHICLES.

Application filed December 22, 1922. Serial No. 608,545.

*To all whom it may concern:*

Be it known that I, JAMES A. Fox, a citizen of the United States, residing at Warren, in the county of Trumbull and State of Ohio, have invented certain new and useful Improvements in Signaling Devices for Motor Vehicles, of which the following is a specification.

This invention relates to signaling devices, particularly electric light signals, and while primarily designed for use in connection with motor vehicles it will be obvious that the device can be employed for any purposes wherein it is found to be applicable.

The primary object of the invention is to provide a signaling device of such class, in a manner as hereinafter set forth, which is operable, from the driver's seat, to indicate to the operator of an approaching, passing or following vehicle the exact intentions of the driver relative to intended operations or movements of his vehicle, thereby avoiding confusion and minimizing accidents ordinarily concurrent with the operation of motor vehicles.

Other objects of this invention are to provide a signal device of the character described, which embodies manifold signals; which is readily discernible during daylight and especially at night, and which includes a shiftable casing allowing the proper mounting of the device at any angle and without interference with the wire connections.

Further objects of the invention are to provide a signal apparatus of the type stated, which will simultaneously indicate the same signals on both its front and rear faces, which is simple in its construction and arrangement, strong, durable and efficient in its use, attractive in appearance, and comparatively inexpensive to manufacture.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of the claims hereunto appended without departing from the principle of the invention.

In the drawing forming a portion of this specification and wherein like numerals of reference designate corresponding parts throughout the several views:—

Figure 1 is a rear view of a signaling device in accordance with this invention.

Figure 2 is a similar view with the rear lens and the rear stencilled sign plate removed therefrom.

Figure 3 is a side view of the device with portions thereof shown in cross section.

Figure 4 is a front view of the lens in the forward end of the signal device illustrating its engagement by the annular metal band.

Figure 5 is a similar view of the lens in the rear end of the device.

Figure 6 is a fragmentary sectional view of the annular clamping band showing the engagement of the associated parts therewith.

Referring in detail to the drawing 1 denotes the rear signal plate, circular in contour, and stencilled or perforated to form the signal designations "Right"—"Stop"—"Slow"—"Left" respectively indicated at 2, 3, 4 and 5. The plate 1 is further formed with a perforated index hand 6, positioned directly above the designation 2 to indicate the direction towards the right, and with a perforated index hand 7, positioned directly below the designation 5, to indicate the direction towards the left.

The front signal plate 8 is identical in construction and in the arrangement of designations as that described relatively to the rear plate 1, with the exception that all designations on front plate 8 are disposed in the reverse direction with respect to the designations carried by the rear plate 1. The reason for this is obvious, as the rear signal plate 1 is adapted to be read from a position in rear of the device, and the front signal plate 8 from a position in front of the device.

The rear signal plate 1 and the front signal plate 8 are fixedly secured together in spaced relation with respect to each other by means of the interposed horizontally disposed upper partition 9, the horizontally disposed lower partition 10, and the vertical partition 11. The latter is positioned between the partitions 9 and 10 and is fixedly therewith intermediate of their ends. The partitions 9 and 10 extend parallel with respect to each other, and the outer ends of each is formed with a centrally disposed recess 9' for the purpose to be described.

When the rear and front signal plates 1 and 8 are assembled with the partitions 9, 10 and 11, they provide in combination four separate compartments, indicated respectively at 12, 13, 14 and 15.

An electric lamp 15' is mounted to extend into each of the compartments 12, 13, 14 and 15 and are carried by the horizontal partitions 9 and 10, as clearly shown in Figure 2 of the drawing.

The rear lens 16 is positioned against the outer face of the signal plate 1 and is red in color, and the front lens 17 is positioned against the outer face of the front signal plate 8 and is green in color. The lenses 16 and 17 are of the same diameter as the diameter of the plates 1 and 8 against which they are placed.

An annular clamping band 18 is provided for securing the lenses 16 and 17 to respective plates 1 and 8. The longitudinal edges of the band 18 are formed to provide narrow inwardly disposed flanges 19 which overlap the peripheries of the respective lenses 16 and 17 and secure them in position against the plates 1 and 8. The ends of the band 18 are secured together with the common tongue and slot connection, as indicated at 20, to permit of its assembly to provide a clamping action.

The band 18 is further provided with a circumferentially extending groove 21 positioned centrally of the band 18. The rib formed on the inner face of the band 18 by the formation of the groove 21 engages in the recesses 9' provided in the outer ends of the horizontal partitions 9 and 10 and prevents lateral movement of the band 18 when positioned on the plates 1 and 8. An aperture 22 is provided in the band 18 for the passage of wiring connections 23 leading from the lamps 15' to the source of electrical supply.

The plates 1 and 8 fixed to the partitions 9, 10 and 11, which latter carry the lamps 15' together with the lenses 16 and 17, are assembled as a body portion by means of the band 18, and is housed as a whole in a suitable annular casing 24. The inner face of the casing 24 carries a plurality of circumferentially disposed fixed springs 25 arranged in pairs equally spaced from each other. Each spring of a pair of springs extends in parallel with respect to the other of the pair and each is mounted adjacent to a respective edge of the band 18.

When the casing 24 is positioned to house the assembled body portion above described, the springs 25, carried by the former, will engage the periphery of the band 18 on both sides of the band groove 21, and provide a resilient mounting whereby the lenses 16 and 17 and the lamps 15' are fully protected against breakage due to the severe vibrations and jars to which the device is necessarily subjected during the travel of the vehicle to which it is attached.

An attachment bracket 26 is riveted to the periphery of the casing 24 and is provided for securing the signaling device to the vehicle to suitably position same so that the signals may be distinctly seen by the operators of approaching or following vehicles. The bracket 26 is provided with an aperture 27 for the passage of the wiring connections 23 therethrough.

The casing 24 due to its resilient connection with the band 18 may be slidably shifted on the latter to position the bracket 26 to accommodate its attachment to the vehicle to best meet conditions desired. The friction of the springs 25 against the band 18 will maintain the casing 24 in the adjusted position.

Ample slack in the wiring connections 23 is allowed to permit of the shifting of the casing 24, as above described. During the shifting of the casing 24, the wiring 23 is positioned in the groove 21 which latter affords clearance to prevent binding interfertion of the springs 25 against the band 18 during the shifting operation.

It will here be noted that while the lenses 16 and 17, as herein described, are preferably and respectively red and green in color, additional individual colored lenses may be positioned in the compartments on the inner faces of the plates 1 and 8 to show the signals on the latter in various desired colors. In this latter construction, however, the lenses 16 and 17 would not be colored.

An annular rim 28, substantially L-shaped in cross section, is mounted to overlap each edge of the casing 24 and the depending flanges 19 of the band 18. The rim 28 is secured in position by means of the screws 29. Besides effecting a finished and attractive appearance to the device the rim 28 will prevent the lateral movement of the casing 24 upon the clamping band 18.

Any suitable signal operating switches may be employed in connection with my improved signaling device. They should, however, be positioned to permit of their convenient manipulation by the operator from the driver's seat.

A signaling device of my improved construction is intended to be operated to independently flash one or several of the signal designations 2, 3, 4 and 5 at one time, as desired. The plates 1 and 8, having identical designations perforated therein, the signal will be projected therethrough and discernible to the operator of either an approaching or following vehicle.

What I claim is:—

1. A signaling apparatus for motor vehicles comprising in combination, a front plate provided with a plurality of signal designations, a rear plate provided with a plurality of signal designations, partitions interposed between said front and rear plates and connecting said plates in spaced relation with respect to each other and forming a plurality of compartments, an illuminating device mounted in each of said compartments, a lens positioned against each of said plates, an annular clamping band having its edges formed to provide flanges adapted to overlap the peripheral edges of said plates for securing said lenses to said plates, said band formed with a centrally disposed annular groove, an annular casing carrying a plurality of flat springs on its inner face resiliently engaging said band, an attachment bracket fixedly mounted on said casing, said casing circumferentially shiftable on said band to permit of the adjustment of said attachment bracket relatively to said band, a rim overlapping each of the marginal edges of said casing, said illuminating devices including wire conductors adapted to engage in said annular groove to provide clearance when said casing is circumferentially shifted in said groove, substantially as described and for the purpose set forth.

2. In combination, a signaling device for motor vehicles, comprising a front plate provided with a plurality of perforated signal designations, a rear plate provided with a plurality of perforated signal designations corresponding to the said signal designation provided on said front plate, partitions including a pair of horizontally disposed partitions and a vertically disposed partition fixedly connected with and securing said front and rear plates in spaced relation with respect to each other and forming a plurality of compartments each of said compartments common to a front plate signal designation and to the corresponding rear plate signal designation, the outer end of said pair of horizontally disposed partitions formed with centrally disposed recesses, a lens positioned against the outer face of each of said plates, an annular clamping band fixedly mounted on the peripheral edges of said plates and said lenses and engaging the said recesses formed in the ends of said pair of horizontally disposed partitions, said band having its edges formed to provide flanges overlapping the peripheral marginal edges of said lenses for securing the latter against said plates, the outer face of said band formed with a circumferentially extending groove, an annular casing surrounding said band and provided with a plurality of springs on its inner face engaging said band for resiliently supporting said band in said casing, a pair of rims carried by the marginal edges of said casing for maintaining the latter in position on said band, an attachment bracket fixed to the periphery of said casing, said casing circumferentially shiftable on said band for adjusting said bracket relatively to said band, a lamp mounted in each of said compartments, and electrical conductors connected with said lamps and positioned in said groove to provide clearance to permit of the circumferential shiftable movement of said casing on said band, substantially as described and for the purpose set forth.

In testimony whereof I affix my signature.

JAMES A. FOX.